June 12, 1962  H. H. DEIST  3,038,343
AUTOMATIC BALANCING DEVICE
Filed Dec. 31, 1956  3 Sheets-Sheet 2
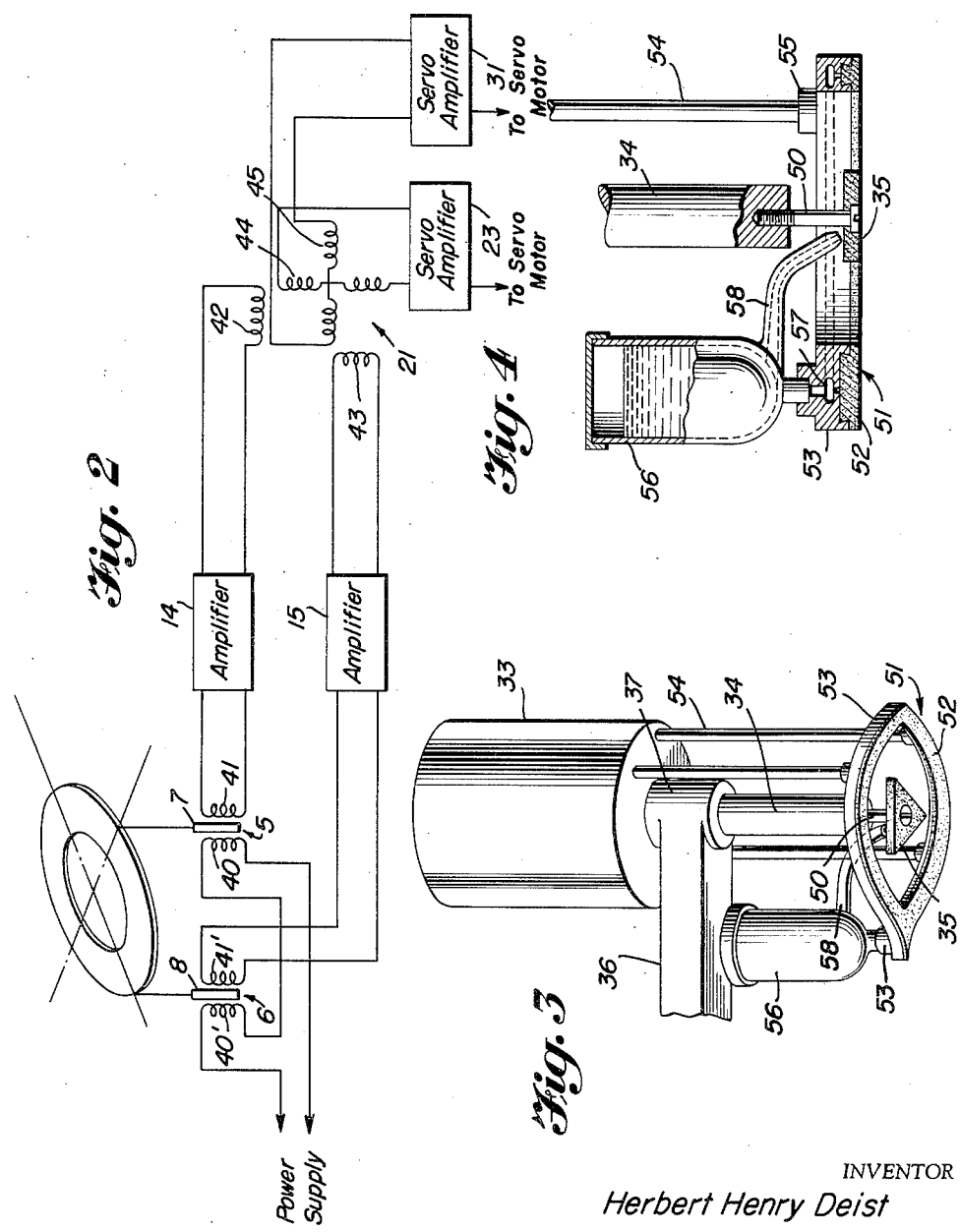
INVENTOR
Herbert Henry Deist
BY W. A. Fraser
ATTORNEY

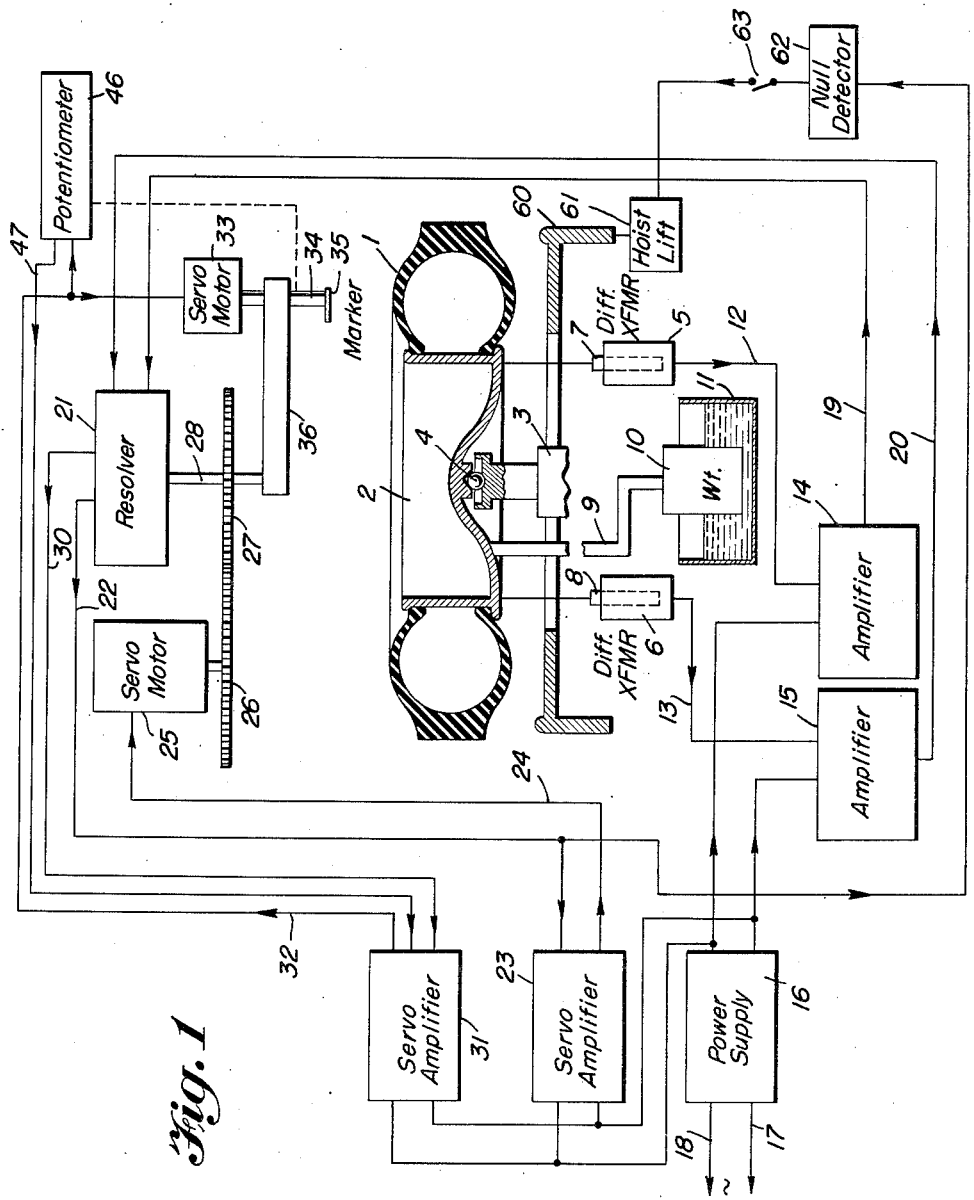

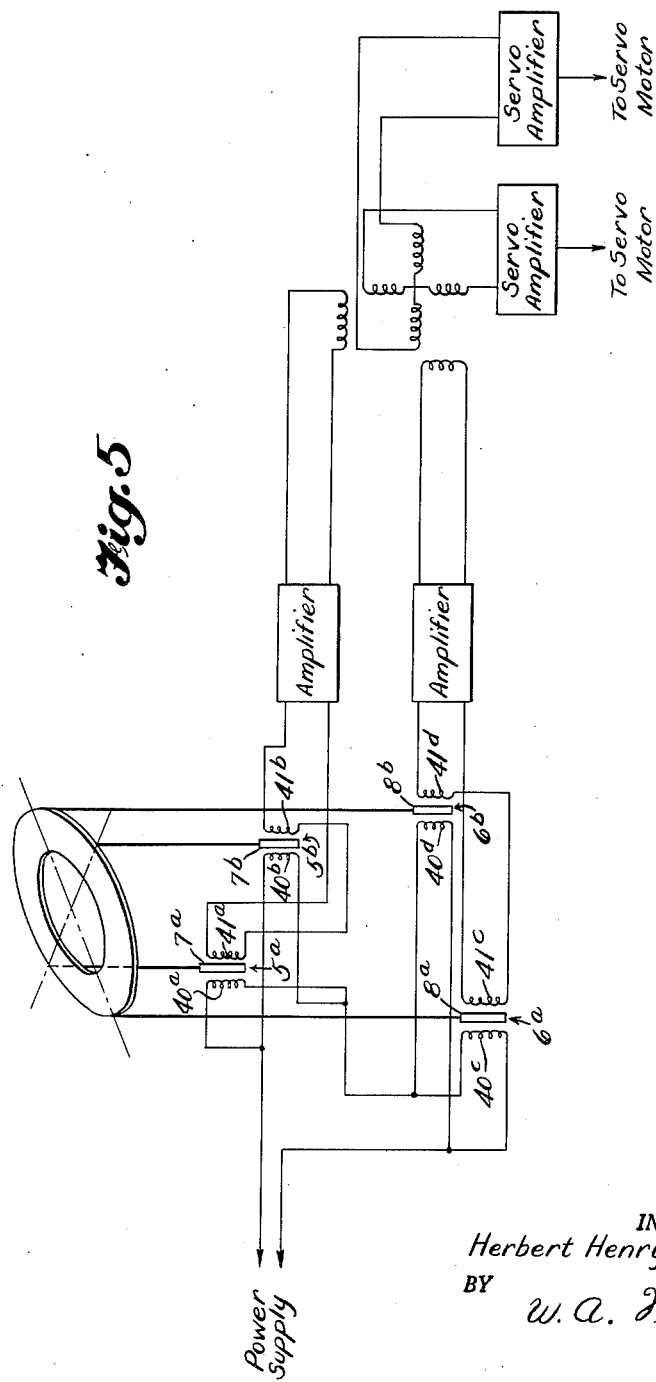

United States Patent Office 3,038,343
Patented June 12, 1962

3,038,343
AUTOMATIC BALANCING DEVICE
Herbert H. Deist, Akron, Ohio, assignor to The Firestone Tire & Rubber Company, Akron, Ohio, a corporation of Ohio
Filed Dec. 31, 1956, Ser. No. 631,873
8 Claims. (Cl. 73—483)

The present invention relates to tire or wheel unbalance indicating devices, and, more particularly, to devices for automatically indicating the amount and angular location of unbalance of a tire or wheel.

Many solutions for the problem for determining and indicating the unbalance of automobile tires and wheels have been devised, some of which are quite simple and some of which are extremely complicated and impractical. One type of device currently in use employs a pivot for the center of the wheel or tire which permits the tire to assume a position with respect to the pivot determined by its unbalance, and a spirit level mounted on the base of the device then indicates the amount and angle of unbalance. Such a device is inherently slow in response and difficult to read accurately. Moreover, the angular position and amount of unbalance must be separately indicated, usually manually, before the information obtained can be of any use and so that the proper weight or weights may be placed on the tire to correct the unbalance condition. The time consumed in such a procedure is particularly disadvantageous in assembly-line testing.

The apparatus of the present invention is designed to permit the detection and indication operations to be performed automatically and in proper sequence so that no time need be wasted in the testing procedure. Moreover, provision may be also made for supplying the tires to the unbalance detecting and indicating device automatically, while previous ones are tested, marked, and removed, also automatically.

The apparatus of the invention provides for detection of the angular position and the amount of unbalance of the tire or wheel and provides an indication of the amount of unbalance, which indication is preferably stamped or imprinted on the tire at the angular position of unbalance. To provide for these purposes, the apparatus includes supporting means and a pivot for the tire or wheel which allows it to assume a tilted position with respect to a horizontal plane. The plane in which the tire or wheel is tilted is indicative of the angle and amount of unbalance and the tilted position is detected by electromechanical transducing means which provide a pair of voltages responsive to the extent and plane of tilt. The imprinting function may be performed by marking means which are movable with respect to the tire or wheel to the angular position of unbalance and whose indication is determined by the amount of unbalance. The indexing means for the marker and the magnitude of the indication are controlled by voltages from a resolver supplied with the transducer voltages.

The invention will now be more fully described in conjunction with a preferred embodiment of the invention shown in the accompanying drawings.

In the drawings:

FIG. 1 is a diagrammatic showing of the apparatus of the invention, with the tire and supporting means therefor shown in partial section, and with the electrical apparatus in block diagram form;

FIG. 2 is a schematic diagram of the electrical apparatus of the invention;

FIG. 3 is a detail perspective view of the marking means of the apparatus;

FIG. 4 is a partial vertical sectional view through the marking apparatus of FIG. 3; and FIGURE 5 is a schematic diagram of a modification of the electrical apparatus of the invention.

Referring to FIG. 1, a tire 1 which is to be tested is positioned on a chuck or table 2 which is supported from a pedestal 3 by means of a ball pivot 4 located at the center of gravity of the chuck. (It will be evident that a wheel could be supported by the chuck, as well as a tire alone.) The chuck forms the support for the tire, and the pivot 4 enables the chuck to assume a position determined by the center of gravity of the tire.

When an unbalanced tire or wheel is supported by the chuck and the pivot ball 4 from the standard or pedestal 3, the chuck will assume a position tilted to an angle and extent with respect to a horizontal plane determined by the amount and angular position of unbalance of the tire or wheel. The means for detecting the unbalance includes a pair of differential transformers 5 and 6 which, as shown in FIG. 2, are spaced 90 degrees apart with relation to the plane of the tire and supporting chuck. The differential transformers have their cores 7 and 8, respectively, attached to the lower side of the support chuck 2 by an appropriate means, so that the positions of the cores are determined by the plane of the support chuck.

In the modification shown in FIGURE 5, the means for detecting the unbalance includes four differential transformers 5a, 5b, 6a, and 6b spaced 90 degrees apart and having cores 7a, 7b, 8a, and 8b, respectively.

The differential transformers employed in this apparatus are merely examples of a type of electromechanical transducing device suitable for use with the invention. A suitable transducing device is one which contains at least two parts, with one part movable with respect to the other, and which device provides an output voltage of magnitude varying with the position of the movable part with respect to the fixed part. The differential transformers employed include a pair of transformer windings, with the core being of magnetic material and being operable when its position is changed to change the output voltage, the voltage across one of the windings.

In order to stabilize the support chuck and to lower the effective center of gravity of the chuck and the tire or wheel supported thereon, the apparatus is provided with an arm 9 which is attached to the lower side of the chuck and extends downward therefrom to a mass or weight 10 which is immersed in a pan 11 containing damping fluid. The damping fluid is preferably oil. Lowering the center of gravity in this manner prevents severe tilting when a tire which is merely slightly unbalanced is on the chuck. When the chuck is in a horizontal position, its center of gravity is coincident with a vertical line passing through the point about which the chuck pivots.

Since the differential transformers are connected to points on the support chuck spaced 90 degrees apart in the horizontal plane of the chuck, their output voltages resolve the unbalance of the chuck caused by the unbalanced tire into rectangular coordinates. These output voltages are supplied by means of connections 12 and 13 to suitable amplifiers 14 and 15, respectively, which may be of the usual electronic type. The amplifiers are powered from a power supply 16 of conventional design, which receives its energy from a suitable source of single phase alternating current power (not shown) through lines 17 and 18.

The output voltages of the amplifiers 14 and 15 are supplied through connections 19 and 20 to an induction resolver 21. The induction resolver is a standard device including, as may be seen in FIG. 2, a pair of stator windings arranged at right angles to one another, and a pair of rotor windings, each composed of two coils, and also wound at right angles to one another. Two output voltages are obtained from the resolver, one of these output voltages being supplied through connections 22 to a servo amplifier 23, which is also energized from the power supply 16. The output voltage of the servo amplifier 23, which may be of conventional electronic design, is supplied through connections 24 to a servo motor 25, which may also be of conventional design. The servo motor drives a spur gear 26 which meshes with a similar spur gear 27 fixed to the shaft 28 of the induction resolver 21. Thereby, the shaft of the resolver is driven to a position determined by the output of the resolver supplied through connection 22 to the first servo amplifier.

The second output of the resolver is connected through line 30 to a second servo amplifier 31, which is also energized from power supply 16. Servo amplifier 31 has its output connected through lines 32 to a second servo motor 33. The servo amplifier 31 and servo motor 33, like the amplifier 23 and motor 25, may be of conventional design and, since their specific constructions are not important to this invention, they will not be further described. Servo motor 33 has an output shaft 34 which drives a marker member 35. Therefore, the angular position of the marker member with respect to the axis of rotation of the servo motor, is determined by the second output of the induction resolver supplied through connections 30.

As is more evident from FIG. 3, the servo motor 33 and the marker 35 are supported by shaft 28 of the induction resolver by means of a radial arm 36 attached at its inner end to shaft 28 and forming a journal 37 for shaft 34 at its outer end. Thereby, the angular position of the marker with respect to the axis of rotation of the tire is determined by the voltage supplied the first servo motor 25, and therefore by the first output voltage of the resolver 21.

Referring next to FIG. 2 for a more complete description of the electrical apparatus of the invention, each of the linear differential transformers 5 and 6 includes a primary coil 40 and 40' and a secondary coil 41 and 41', respectively. Energizing voltage for the primaries is supplied from a suitable source of power (not shown) through a series connection of the primaries of the differential transformers. The output of each of the differential transformers is zero voltage when the core is in its normal mid-point position (corresponding to the normal balanced position of the chuck 2) and increases in amplitude in the positive or negative direction linearly with changing position of the core above or below the normal position. In other words, the output of a differential transformer is of opposite phases for opposite displacements of the core from its mid position.

In the modification shown in FIGURE 5, each of the differential transformers 5a, 5b, 6a, and 6b includes a primary coil 40a, 40b, 40c, and 40d and a secondary coil 41a, 41b, 41c, and 41d, respectively. The primary coils are preferably connected in series-parallel as shown, but they can also be connected in series or in parallel. Secondaries 41a and 41b are connected in series and so phased that their voltages add. Secondaries 41c and 41d are similarly connected.

As indicated above, the outputs of the differential transformers are amplified in amplifiers 14 and 15 and supplied to the stator windings of induction resolver 21. Also as indicated, one of the transformer voltages is supplied to one stator winding 42, and the second voltage is supplied to a second stator winding 43, at right angles to the first stator winding. Further as indicated above, the rotor windings of the induction resolver comprise a first winding 44 and a second winding 45, each including a pair of series-connected coils, and arranged at right angles to each other. The output voltage developed across coil 44 is supplied to servo amplifier 23, while the output voltage developed across coil 45 is supplied to servo amplifier 31.

The induction resolver is a standard item of commerce readily obtained from a number of different manufacturers. This apparatus supplies at one rotor winding a voltage proportional to the difference between the product of the cosine of the angle of relative position of the resolver shaft and the magnitude of the voltage supplied one of the stator coils, and the product of the sine of that angle and the voltage supplied to the other stator coil. The other rotor winding develops a voltage equal to the sum of the product of the cosine of that angle and the voltage supplied the second stator winding with the product of the sine of that angle and the voltage supplied the first stator winding. The theory and operation of the induction resolver is described in "Components Handbook," Blackburn, Radiation Laboratory Series, vol. 17, McGraw-Hill, pages 340–345, and in "Resolver Handbook," Reeves Instrument Corporation, Rico Bulletin No. 57, copyright 1954. From these publications, it is evident that the voltage developed across coil 45 is determined by the angular position of the vector sum of the voltage outputs of the transducers.

Referring again to FIG. 1, the shaft 34 of servo motor 33 also drives the wiper of a potentiometer indicated schematically at 46. The output voltage of the amplifier 31 is supplied across the potentiometer and the portion of that voltage determined by the position of the potentiometer wiper is supplied amplifier 31 through connections indicated at 47. This portion of the potentiometer voltage is compared with the output of induction resolver 21 supplied along line 30 and the difference of the voltages is amplified for supply to servo motor 33 along line 32. Thereby, servo motor 33 is supplied with driving voltage until it reaches its proper position determined by the output of the induction resolver, when the driving voltage is zero and the motor, marker 35, and potentiometer 46 come to rest.

With the closed loop apparatus above described, the servo motor 25 maintains the shaft 28 of the resolver in an angular position such that winding 44 is at right angles to the stator field. The angular position of shaft 28 then corresponds to the arctangent of the ratio of the voltage outputs of the transducers or differential transformers 5 and 6. When this angular position is reached, the output voltage supplied by connection 30 from the induction resolver is proportional to the root-mean-square of the voltage outputs of the differential transformers. This voltage, as opposed by the voltage supplied by potentiometer 46, is supplied to servo motor 33, so that the marker 35 is directed to a position determined by the square root of the sum of the squares of the outputs of the differential transformers.

The induction resolver, then, transforms the rectangular coordinates of the supporting chuck's position into polar coordinates. The arm 36 is directed to an angular position by the shaft 28 of the resolver 21 such as to indicate the angular position of the unbalance of the tire 1, as detected by the differential transformers. Since the marker 35 is carried by arm 36, the marker then is directly above the angular position of unbalance of the tire.

The marker 35 is adapted to form an indication which is proportional to the amount of unbalance of the tire, which indication is preferably imprinted directly on the tire itself. Referring to FIGS. 3 and 4, the marker 35 may be composed of a felt pad of triangular form which is suspended from the bottom end of shaft 34 by a bolt 50 threaded into the shaft. A reference marker 51 surrounds the unbalance marker 35 and comprises an annular felt pad 52 fixed at the lower side of a correspondingly-shaped metal plate 53. The reference marker 51 is suspended from the casing of servo motor 33 in any suitable manner, as by support rods 54. The support rods may be threaded into bosses 55 at the upper side of metal plate 53 and also into the lower side of the motor casing.

Ink or paint is supplied to felt pads 35 and 52 from a suitable reservoir 56 supported above metal plate 53. The ink or paint is supplied to a channel 57 which extends around the metal plate and communicates with the upper side of the felt pad 52, so that the pad is saturated with the marking fluid. A pipe 58 also carries the fluid to the upper side of pad 35.

With the above-described construction of the marker, the shaft 34 of the servo motor rotates the triangular marker pad 35 to an angular position with respect to reference marker 51 determined by the magnitude of the voltage supplied the servo motor. That angular position is indicative of the voltage, and suitable calibration may be provided, or the approximate magnitude of the indication may merely be determined by an operator experienced with the apparatus.

Referring to FIG. 1, the indication of the marker is imprinted on the tire or wheel by raising it into contact with the felt pads 35 and 52, as by lifting hoist 60. The hoist may be of construction conventional in the tire-unbalance testing field including pneumatic or hydraulic motors, or other suitable electrical or mechanical means may be employed. The hoist may be raised by hand by the operator, or mechanical means may be provided to accomplish the marking automatically. If the latter is desired, the hoist lift 61 may also be provided with means to cause its actuation a predetermined time interval after a tire or wheel is placed on chuck 2, or the lift may be energized by electrical control means including a null detector 62 connected to servo amplifier 23. The null detector 62 may be responsive to attainment of zero output voltage across rotor coil 44 of the resolver, indicating that the arm 36 has reached its proper angular position determined by the angle of unbalance of the tire or wheel, and may then operate to energize the hoist lift 61. A suitable on-off switch 63 may be provided to prevent energization of the hoist lift prematurely. The switch 63 may be normally open and be closed by the operator only after a tire or wheel is placed on the chuck and the induction resolver begins its movement.

In operation of the preferred embodiment of the invention above described, the chuck 2 is normally in a horizontal plane, but when an unbalanced tire or wheel is placed thereon, the chuck tilts to a plane determined by the magnitude and location of unbalance of the tire or wheel. This tilting action causes movement of the cores of differential transformers 5 and 6 and consequent resolution of the location of the plane of the tire or wheel into rectangular coordinates as indicated by voltages obtained across the secondary coils of the transformers. The induction resolver 21 then transforms the rectangular coordinates into polar coordinates by feeding a voltage to amplifier 23 and servo motor 25 which causes the motor to rotate or index the resolver shaft to a position such that the voltage across coil 44 of the resolver is zero, or that the coil is at right angles to the vector of the stator voltages of the resolver. The radial arm 36, being fixed to the resolver shaft, then is in an angular position indicative of the angular position of unbalance of the tire or wheel. When this position has been reached, the voltage across the rotor coil 45 of the resolver is equal to the root-mean-square of the differential transformer voltages, or to the magnitude of the vector indicating the magnitude of unbalance of the tire or wheel. This voltage is supplied to servo amplifier 31 and, opposed by the voltage from potentiometer 46, to servo motor 33, and the latter rotates or indexes unbalance marker 35 to a position indicating the magnitude of unbalance.

The null detector 62 at this time indicates that arm 36 is in proper angular position and, with switch 63 closed, causes energization of hoist lift 61 to lift the tire or wheel into contact with the marker. The unbalance marker and reference marker are thereby imprinted on the surface of the tire or wheel.

The apparatus as described includes a marker which provides for direct marking of the angular location and magnitude of unbalance on the tire or wheel. It will be understood, however, that simple indicators, rather than a marker, could be provided. If indicators were used, however, an operator would be required to note the indications, whereas, if a marker is used, the indications may be imprinted directly on the tire by the testing apparatus, so that it is preferred that a marker be used. Moreover, it will be understood that a different type of marker than that disclosed might be employed. Any marker that provides a suitable indication on the tire or wheel of the angle and amount of unbalance could be used.

As an illustration of apparatus for translating the plane of tilt of the tire or wheel into electrical voltage representation, a pair of 90°-spaced transducers have been disclosed. As indicated, these transducers translate the position of the plane into rectangular coordinates. However, it is not necessary that only two transducers, or 90° spacing, be employed, though the arrangement disclosed is probably the most convenient. It is only necessary that the plane of tilt of the tire or wheel be translated into polar coordinates by means of voltages suitable to direct the marker to the suitable angular position and to drive the indicator to an indication of the amount of unbalance. A modification employing four transducers is shown in FIGURE 5.

It will also be understood that many other minor changes in the apparatus of the preferred embodiment could be made without departure from the scope of the invention. Accordingly, the invention is not to be considered limited to the embodiment shown and described, but rather only by the scope of the appended claims.

I claim:

1. Apparatus for marking on a tire or wheel the location and amount of unbalance thereof, comprising means for supporting the tire or wheel in a generally horizontal plane, pivot means on a vertical line through the center of gravity of said supporting means for permitting the supporting means and an unbalanced tire or wheel supported thereon to tilt with respect to a horizontal plane to bring the center of gravity of the combination of supporting means and unbalanced tire or wheel to a stable position coincident with said vertical line, a pair of electromechanical transducers each having one part movable with respect to another part and operable on input voltages of the same phase to produce output voltages having characteristics varying with respect to the relative positions of the parts, said one parts of the transducers being connected to points on the supporting means spaced 90 degrees apart in said horizontal plane so as to cause movement of the parts when the corresponding points of the supporting means move above and below said plane, marker means including two marking parts and having one part movable with respect to another part to indicate the magnitude of unbalance of the tire or wheel and operable to imprint that indication thereon, means for indexing the marker means to a position relative the angular position of unbalance of the tire or wheel, and means connected between said transducers and said indexing and marker means operable to translate the output signals of the transducers into operation of the marker means and the indexing means.

2. Apparatus for marking on a tire or wheel the location and amount of unbalance thereof, comprising means for supporting the tire or wheel in a generally horizontal plane, pivot means on a vertical line through the center of gravity of said supporting means for permitting the supporting means and an unbalanced tire or wheel supported thereon to tilt with respect to a horizontal plane to bring the center of gravity of the combination of supporting means and unbalanced tire or wheel to a stable position coincident with said vertical line, a pair of electro-mechanical transducers each having one part movable with respect to another part and operable on input voltages of the same phase to produce output voltages having amplitudes varying with respect to the relative positions of the parts, said one parts of the transducers being connected to points on the supporting means spaced 90 degrees apart in said horizontal plane so as to cause movement of the parts when the corresponding points of the supporting means move above and below the plane, marker means comprising two marking parts and having one part movable with respect to another part in response to the magnitude of voltage supplied it and operable to imprint an indication of the extent of that movement upon the tire or wheel, means for indexing the marker means with respect to the tire or wheel to an angular position determined by the magnitude of voltage supplied it, means supplied with the voltage outputs of the transducers operable to supply voltages to said indexing means and said marker means to cause the marker means to index to the point of unbalance of the tire or wheel and to cause the marker means to indicate the magnitude of unbalance, and means for causing the marker means to imprint its indication on the tire or wheel.

3. The apparatus of claim 2 in which said marker means is positioned above the tire or wheel and said tire or wheel is axially movable.

4. Apparatus for marking on a tire or wheel the location and amount of unbalance thereof comprising means for supporting the tire or wheel in a generally horizontal plane, pivot means on a vertical line through the center of gravity of said supporting means for permitting the supporting means and an unbalanced tire and wheel supported thereon to tilt with respect to a horizontal plane to bring the center of gravity of the combination of supporting means and unbalanced tire or wheel to a stable position coincident with said vertical line, a pair of electromechanical transducers each having one part movable with respect to another part and operable on input voltages of the same phase to produce output voltages having amplitudes and phases varying with respect to the relative positions of the parts, said one parts of the transducers being connected to points on the supporting means spaced 90 degrees apart in said horizontal plane so as to cause movement of the parts when the corresponding points of the supporting means move above and below the plane, a shaft aligned with the axis of the tire or wheel, marker means movable in response to the magnitude of voltage supplied it and operable to imprint an indication of the extent of that movement upon the tire or wheel, means coupling the shaft and the marker means together with the marker means positioned radially outwardly of the shaft, said coupling means being operable to cause the marker means to rotate with the shaft, means supplied with the voltage outputs of the transducers operable to supply a voltage of magnitude determined by the angular position of the shaft, motor means supplied with the output voltage of said last-named means for rotating the shaft to a position where that output voltage is zero, means connected with said means supplied with the voltage outputs of the transducers operable when said output voltage is zero to supply a voltage related to the amount of unbalance in the tire or wheel, said last-named means being connected to said marker means for supplying its voltage output thereto, and means for causing the marker means to imprint its indication on the tire or wheel.

5. Apparatus for marking on a tire or wheel the location and amount of unbalance thereof comprising means for supporting the tire or wheel in a generally horizontal plane, pivot means on a vertical line through the center of gravity of said supporting means for permitting the supporting means and an unbalanced tire or wheel supported thereon to tilt with respect to a horizontal plane to bring the center of gravity of the combination of supporting means and unbalanced tire or wheel to a stable position coincident with said vertical line, a pair of electromechanical transducers each having one part movable with respect to another part and operable on input voltages of the same phase to produce output voltages having amplitudes and phases varying with respect to the relative positions of the parts, said one parts of the transducers being connected to points on the supporting means spaced 90 degrees apart in said horizontal plane so as to cause movement of the parts when the corresponding points of the supporting means move above and below the plane, a shaft aligned with the axis of the tire or wheel, marker means comprising two marking parts and having one part movable with respect to another part in response to the magnitude of voltage supplied it and operable to imprint an indication of the extent of that movement upon the tire or wheel, means coupling the shaft and the marker means together with the marker means positioned radially outwardly of the shaft, said coupling means being operable to cause the marker means to rotate with the shaft, means supplied with the voltage outputs of the transducers including first means operable to rotate said shaft to an angular position such that the marker means is in a predetermined position relative to the position of unbalance in the tire or wheel and second means operable when the shaft is in that position to deliver a voltage related to the amount of unbalance in the tire or wheel to the marker means, and means for causing the marker means to imprint its indication on the tire or wheel.

6. The apparatus of claim 5 in which said last-named means includes means for axially moving the tire or wheel into contact with the marker means.

7. The apparatus of claim 5 in which said means supplied with the voltage outputs of the transducers includes an induction resolver, and a servo motor connected to one of the rotor coils of the induction resolver, said motor being operable to drive the shaft and the rotor of the induction resolver.

8. The apparatus of claim 5 in which each of said transducers is a differential transformer.

References Cited in the file of this patent
UNITED STATES PATENTS

| | | |
|---|---|---|
| 1,701,464 | Kraft | Feb. 5, 1929 |
| 2,155,528 | Cadden | Apr. 25, 1939 |
| 2,515,969 | Shivers | July 19, 1950 |
| 2,701,474 | Goudy | Feb. 8, 1955 |
| 2,711,590 | Wilcox | June 28, 1955 |
| 2,716,893 | Birdsall | Sept. 6, 1955 |
| 2,792,725 | Lannen | May 21, 1957 |
| 2,821,858 | King | Feb. 4, 1958 |
| 2,898,764 | Kinsey et al. | Aug. 11, 1959 |
| 2,947,175 | King et al. | Aug. 2, 1960 |